United States Patent
Koch et al.

(10) Patent No.: US 10,816,023 B2
(45) Date of Patent: Oct. 27, 2020

(54) TAMPER-RESISTANT FASTENER FOR CONNECTING A WHEEL RIM TO A HUB FLANGE OF A MOTOR VEHICLE

(71) Applicant: FORD GLOBAL TECHNOLOGIES, LLC, Dearborn, MI (US)

(72) Inventors: Raphael Koch, Odenthal NRW (DE); Lars Bognar, Dormagen NRW (DE)

(73) Assignee: Ford Global Technologies, LLC, Dearborn, MI (US)

( * ) Notice: Subject to any disclaimer, the term of this patent is extended or adjusted under 35 U.S.C. 154(b) by 266 days.

(21) Appl. No.: 16/157,771

(22) Filed: Oct. 11, 2018

(65) Prior Publication Data
US 2019/0113065 A1    Apr. 18, 2019

(30) Foreign Application Priority Data
Oct. 13, 2017    (DE) .......................... 10 2017 218 306

(51) Int. Cl.
*F16B 23/00*    (2006.01)
*B60B 3/16*    (2006.01)
(Continued)

(52) U.S. Cl.
CPC .......... *F16B 23/0007* (2013.01); *B33Y 80/00* (2014.12); *B60B 3/165* (2013.01);
(Continued)

(58) Field of Classification Search
CPC .... F16B 23/00; F16B 23/0007; F16B 23/003; F16B 23/0069; F16B 41/005;
(Continued)

(56) References Cited

U.S. PATENT DOCUMENTS 2,813,450 A * 11/1957 Dzus ...................... B25B 13/54
411/403
3,529,508 A * 9/1970 Cooksey .................. A47G 3/00
411/374
(Continued)

FOREIGN PATENT DOCUMENTS

DE    19544430 C1    5/1997
DE    19708948 A1    10/1997
(Continued)

OTHER PUBLICATIONS

DE Examination Report DE 10 2017 218 306.3 Filed May 17, 2018. 5 pages.
(Continued)

*Primary Examiner* — Roberta S Delisle
(74) *Attorney, Agent, or Firm* — Raymond L. Coppiellie; Brooks Kushman P.C.

(57) ABSTRACT

A system for connecting a wheel rim to a hub flange of a motor vehicle, having a fastener such a threaded nut or bolt, and a tool which engages the fastener in a positive-locking manner in order to tighten or release the fastener. To provide improved protection against theft of wheel rims and tires, the fastener has an annular groove extending axially from an end surface of the fastener, the groove having an annular base and inner and outer sidewalls shaped to form an undercut wider than an opening of the groove, a recess extending axially below the base for receiving a projection of a complementally-shaped key on the tool to allow rotation of the fastener. The undercut prevents an unauthorized person using a mold-making material, from being able to make an imprint of the groove and producing a tool therefrom to release the fastener.

12 Claims, 5 Drawing Sheets

(51) Int. Cl.
*B33Y 80/00* (2015.01)
*F16B 41/00* (2006.01)

(52) U.S. Cl.
CPC ............ *F16B 23/0069* (2013.01); *B60B 3/16* (2013.01); *B60B 2900/3318* (2013.01); *F16B 23/00* (2013.01); *F16B 41/005* (2013.01)

(58) Field of Classification Search
CPC ........... B33Y 80/00; B60B 3/16; B60B 3/165; B60B 2900/3318; B25B 15/005; Y10S 411/91; Y10S 411/919
USPC .................................................. 411/402, 403
See application file for complete search history.

(56) References Cited

U.S. PATENT DOCUMENTS

| | | | | |
|---|---|---|---|---|
| 3,874,258 | A * | 4/1975 | Semola | B25B 13/485 81/121.1 |
| 4,480,513 | A * | 11/1984 | McCauley | F16L 23/003 411/389 |
| 6,736,579 | B2 | 5/2004 | Lonnqvist et al. | |
| 8,388,294 | B2 * | 3/2013 | Lanneree | F16B 41/005 411/403 |
| 8,992,151 | B2 * | 3/2015 | Parker | F16B 23/0046 411/403 |
| 9,004,836 | B2 * | 4/2015 | Wells | F16B 23/0007 411/402 |
| 9,429,181 | B2 | 8/2016 | Cadena | |
| 9,765,807 | B1 * | 9/2017 | Watts | B60B 3/16 |
| 2003/0165371 | A1 * | 9/2003 | Notaro | F16B 23/0007 411/402 |
| 2009/0129887 | A1 * | 5/2009 | Chang | B25B 13/485 411/402 |
| 2010/0322741 | A1 * | 12/2010 | Lanneree | F16B 41/005 411/500 |
| 2013/0011215 | A1 * | 1/2013 | Wells | F16B 23/0007 411/402 |
| 2013/0304136 | A1 | 11/2013 | Gourlaouen-Preissler et al. | |
| 2014/0363257 | A1 * | 12/2014 | Parker | F16B 23/0046 411/405 |
| 2017/0057282 | A1 | 3/2017 | Fabian et al. | |

FOREIGN PATENT DOCUMENTS

| | | |
|---|---|---|
| DE | 102011080542 A1 | 2/2013 |
| GB | 2313168 A | 11/1997 |
| WO | 9845131 A1 | 10/1998 |
| WO | 2016202943 A1 | 12/2016 |

OTHER PUBLICATIONS

McGard Lug Bolt Wheel Locks Product sold on AutoAnything, Inc. Reference # 209-163-753-7 retrieved from https://www.autoanything.com/wheels-rims/mcgard-lug-bolt-wheel-locks on Jun. 6, 2019.
DE Exam report for DE 10 2017 218 306.3 dated Sep. 27, 2018, 5 pages.

* cited by examiner

TAMPER-RESISTANT FASTENER FOR CONNECTING A WHEEL RIM TO A HUB FLANGE OF A MOTOR VEHICLE

CROSS-REFERENCE TO RELATED APPLICATIONS

This application claims foreign priority benefits under 35 U.S.C. § 119(a)-(d) to DE Application 10 2017 218 306.3 filed Oct. 13, 2017, which is hereby incorporated by reference in its entirety.

TECHNICAL FIELD

The invention relates to a system for connecting a wheel rim to a hub flange of a motor vehicle, having at least one fastener, in particular a wheel nut or a wheel bolt, and at least one tool which can be connected to the fastener in a positive-locking manner in order to tighten or release the fastener.

BACKGROUND

In order to prevent theft of (or other tampering with) high-value wheel rims and tires from motor vehicles, it is known to fix a wheel rim by means of a so-called rim lock to a wheel flange of a motor vehicle. Such a rim lock has a wheel nut or a wheel bolt, on the head of which there is formed a special carrier contour to which a conventional tool which has, for example, a hexagonal carrier contour cannot be connected in a positive-locking manner. Instead, special tools are required in order to be able to release or tighten the rim lock.

Generally, a large number of cars are provided with wheel nuts or wheel bolts whose carrier contours are constructed in an identical manner since with a larger variety or individualization of carrier contours on wheel nuts or wheel bolts, on the one hand, the production of the wheel nuts or wheel bolts and, on the other hand, the production of a required large number of tool geometries would be too cost-intensive. Therefore, it has previously hardly been possible to secure high-value wheel rims and tires against theft.

U.S. Pat. No. 9,004,836 B2 relates to a security fastener for use with a corresponding wrench which has a channel in a head of the security fastener for receiving the wrench, wherein the base of the channel is profiled in such a manner that the depth of the channel varies along the length of the channel. In addition, the channel has an irregular and closed cross-sectional surface-area.

WO 2016/202943 A1 relates to a securing element, such as, for example, a bolt or a nut, for securing a wheel to a vehicle. The securing element has a member which has a cap receiving portion, a threaded portion and a center axis. Furthermore, the securing element has a cap which is arranged in such a manner that it is received by the cap receiving portion and covers the cap receiving portion. The cap receiving portion has a recess or a projection against which the cap is deformed or can be deformed so that the cap forms a mutually coordinated projection or a mutually corresponding recess, wherein the recess or the projection of the cap receiving portion has a longitudinal extent which extends substantially parallel with the center axis.

US 2013/0304136 A1 relates to a screw for securing an upper structure to a bone implant. The screw extends along a longitudinal axis and has a head and a thread. The head has a bearing face which is configured in such a manner that it cooperates with a support face of the upper structure in order to keep the upper structure in position. The thread is configured in such a manner that it engages in a threaded hole in order to clamp the support faces of the upper structure and the screw. Between the support face and the thread, the screw has a security portion. The security portion has a driving shape and a breakable portion at the connection between the security portion and the head of the screw so that the driving shape remains secured to the thread when the breakable portion breaks.

WO 98/45131 A1 relates to vehicle wheel securing means for securing a wheel to a vehicle. The securing means has a securing nut and a wrench. The securing nut has a threaded hole which is adapted in such a manner that it engages with a wheel journal of a vehicle axle and furthermore has a surface which is constructed in such a manner that it engages with the wheel in order to secure the wheel to the axle. The securing nut is constructed in a cylindrical manner at one end at which the threaded hole is arranged, the other end of the securing nut has an outer face which has a large number of grooves which are arranged radially around the longitudinal axis of the securing nut. The wrench is also constructed in a cylindrical manner and has a sleeve on the inner face of which there are arranged locking mechanisms which can engage in the grooves of the securing nut. Only when the locking mechanisms are in alignment with the grooves can the wrench engage in the securing nut and, by selecting the angular positioning of the grooves and the length thereof, a unique combination of a wrench is required in order to enable this engagement. As soon as the wrench engages in the securing nut, a normal wheel nut wrench can be used in order to rotate the securing nut and consequently to secure or release the wheel.

U.S. Pat. No. 9,429,181 B2 relates to a vehicle wheel lock arrangement having a main body and a first sleeve. The main body has a wheel engagement end, a wrench portion, a first support portion and a wrench receiving end. The wrench portion has a large number of surface contours which define a first wrench pattern which is configured in such a manner that it couples with a tool for a torsion movement of the main body. The first sleeve has an open end and a closed end. The open end is fitted to the first support portion of the main body in such a manner that the closed end of the first sleeve covers the wrench receiving end, is exposed with the wrench portion relative to the first sleeve. The first sleeve is retained by the first support portion for rotation about the center axis of the main body and is retained in a non-movable manner relative to an axial direction of the main body.

U.S. Pat. No. 6,736,579 B2 relates to a screw device for the theft protection of vehicle wheels. The screw device has a screw, a sleeve and a locking element. The screw has a head and a portion which is provided with a thread and which can be screwed into a thread of a wheel hub. The locking element has an endless, slightly undulating or curved locking groove in the first end thereof and a coupling portion in the second end thereof in order to be connected to the head in a torsionally rigid manner. The sleeve is constructed in such a manner that it is retained after the connection between the screw and the locking element. The sleeve surrounds the first end of the locking element with a close-fitting arrangement and comprises a first material with a high capacity for resistance with respect to the formation of cracks whilst the first end of the locking element comprises a second material, wherein the first material is softer than the second material so that the sleeve under the action of mechanical damage can be more readily deformed than the first end. The sleeve is sized in such a manner that, after connection relative to the locking element and the screw, it is substantially freely rotatable.

US 2017/0057282 A1 relates to a vehicle wheel anti-theft system having a large number of locking actuators. Each locking actuator is configured in such a manner that it moves between a locked state and an unlocked state. Each locking actuator has a body portion which extends along an axis of the wheel rotation and at least one locking element which is configured in such a manner that it engages in a portion of the wheel in a direction perpendicular to the axis of the wheel rotation when it is in the locked state.

The publication "McGard Lug Bolt Wheel Locks" which can be called up via the link http://autoanything.com/wheels-rims/mcgard-lug-bolt-wheel-locks discloses a rim lock with wheel nuts which have a special carrier contour.

SUMMARY

The disclosed fastener provides improved protection against theft of (or other tampering with) wheel rims and tires.

It should be noted that the features and measures set out individually in the following description can be combined with each other in any technically advantageous manner and set out other embodiments of the invention. The description additionally characterizes and specifies the invention in particular in connection with the Figures.

According to the invention, both the fastener and the tool which can be connected thereto so as to transmit torque are produced in each case using an additive production method, in particular a 3D printing method. This has the advantage that fasteners and corresponding tools can be produced in a simple and cost-effective manner with a very large variety of carrier contours. In addition, it is also possible to produce in a very simple and cost-effective manner on fasteners and tools very complex carrier contours which cannot be produced by means of conventional production methods, such as, for example, milling, forging and the like. It is further possible for a customer to predetermine a specific individually configured carrier contour, for example, initial letters or the like, which can then be produced by the vehicle manufacturer using an additive production method.

The invention consequently enables a very large variety of carrier contours on fasteners and tools, without incurring disproportionately high production costs in this case. In addition, as a result of the large variety or individuality of the carrier contours which can be produced, there is provided an improved protection against theft of wheel rims and tires since the release of the fasteners is possible exclusively using tools which are individually adapted to the carrier contours of the fasteners and which are not available to third parties.

The fastener may be constructed as a wheel nut which can be bolted onto a threaded bolt which is arranged on the hub flange or as a wheel bolt which can be bolted into a threaded hole in the hub flange. The fastener may alternatively be other than a threaded fastener, such a "quick-connect" fastener. The fastener may advantageously be produced from a metal material which is used during the additive manufacturing method for producing the respective fastener. The fastener may have a head on the end face of which there is arranged at least one groove which has a carrier contour and in which at least one portion of the tool can engage in order to tighten or release the fastener by means of the tool. In particular, the portion of the tool may engage in the groove in a positive-locking manner.

The tool may form an integrated portion of a tool or be constructed as an attachment which can be connected to a tool and via which the tool can be indirectly connected to the fastener. The tool is produced from a metal material which is used during the additive production method in order to form the respective tool. The tool may have an assembly face on which there is arranged at least one projection which has a carrier contour and which can be inserted into the groove on the fastener in order to tighten or release the fastener using the tool. The carrier contour on the tool may be constructed so as to complement the carrier contour on the fastener so that the carrier contours can be connected to each other in a positive-locking manner. The carrier contours can be constructed and adapted to each other in such a manner that the projection on the tool can be inserted in a correct manner into the groove on the fastener only when there is a specific relative position between the tool and the fastener.

Using the invention, there is consequently proposed a system for connecting a wheel rim to a hub flange of a motor vehicle, by means of which a very high level of protection against theft of wheel rims and tires can be provided and which can be produced at the same time with relatively low production costs.

According to an advantageous embodiment, on a head of the fastener there is formed at least one groove in/within which at least one undercut is formed. As a result of the construction of the undercut on the groove, an unauthorized person using a mold-making material, such as wax, is prevented from being able to make an imprint of the geometry of the groove in order on the basis of the imprint to produce a tool for releasing the fastener. This is because, as a result of the presence of the undercut in/within the groove, the mold-making material would be deformed when pulled out of the groove. Consequently, the theft protection of the system is further increased as a result of the arrangement of the undercut in the groove. On the groove, two or more undercuts may also be formed. The groove may, for example, be constructed as a trough-like recess, as a coherent channel or the like.

Another advantageous embodiment makes provision for at least one positioning marking for positioning the tool relative to the fastener to be arranged on the head. This is particularly advantageous when the carrier contours on the fastener and the tool are constructed and adapted to each other in such a manner that the carrier contours can be connected to each other in a positive-locking manner only when there is a specific relative position between the fastener and the tool, in particular when the shaping of the groove is arranged on the fastener so as not to be able to be identified from the outer side. The positioning marking may be constructed, for example, as a point-like, polygonal or arrow-like protrusion or as a correspondingly formed recess. Preferably, there is also arranged on the tool a corresponding positioning marking which is intended to be orientated in a specific manner relative to the positioning marking on the fastener in order to be able to connect the tool to the fastener in a positive-locking manner.

According to another advantageous embodiment, the groove is constructed in an annular manner and has a base in which there is formed at least one recess which extends along a portion of the base, wherein there is formed on the tool at least one annular key which is constructed so as to complement the groove. As a result of the annular construction of the groove, it is not possible to insert into it a conventional tool, such as, for example, a screwdriver or pliers. In addition, the annular groove forms an annularly extending, that is to say, self-contained channel whose width in comparison with the depth thereof as far as the base may be relatively small so that the geometry of the groove, in particular the base and the recess which is arranged therein, cannot be or can be only poorly visually detected from the outer side which makes it significantly more difficult to copy this geometry. There can be arranged in the base, two or more recesses which are arranged in a uniform or non-uniform manner in a state offset peripherally from each other. Since the annular key of the tool is constructed so as to complement the groove, the key can be inserted into the groove in a positive-locking manner.

According to another advantageous embodiment, the groove is constructed as an asymmetrically shaped recess, wherein there is formed on the tool at least one asymmetrically shaped key which is constructed so as to complement the groove. The groove may, for example, be formed by a closed channel which reproduces an outline of a location, an island or the like, or a path of a running track or the like. The groove may alternatively also be constructed in the form of one or more letters. Since the asymmetrically shaped key of the tool is constructed so as to complement the groove, the key may be inserted into the groove in a positive-locking manner.

The above object is further achieved by a method having the features of claim 6, according to which the fastener and the tool are each produced using an additive production method.

The advantages mentioned above with reference to the system are accordingly linked to the method. In particular, the system can be produced in accordance with one of the above-mentioned embodiments or any combination of at least two of these embodiments with each other using the method.

According to an advantageous embodiment, the fastener is produced with a head on which there is formed at least one groove in which at least one undercut is formed. The advantages which are mentioned above with reference to the corresponding embodiment of the system are accordingly connected with this embodiment.

Another advantageous embodiment makes provision for the fastener to be produced with the head on which at least one positioning marking for positioning the tool relative to the fastener is arranged. The advantages which are mentioned above with reference to the corresponding embodiment of the system are accordingly connected with this embodiment.

According to another advantageous embodiment, the fastener is produced with an annular groove which has a base in which there is formed at least one recess(es) which extend(s) along a portion of the base, wherein the tool is produced with at least one annular key which is constructed so as to complement the groove. With this embodiment, the advantages which are mentioned above with reference to the corresponding embodiment of the system are accordingly connected According to another advantageous embodiment, the fastener is produced with a groove in the form of an asymmetrically shaped recess, wherein the tool is produced with at least one asymmetrically shaped key which is constructed so as to complement the groove. The advantages which are mentioned above with reference to the corresponding embodiment of the system are accordingly connected with this embodiment.

Other advantageous embodiments of the invention are disclosed in the dependent claims and the following description of the Figures, in which:

DETAILED DESCRIPTION

Figure 1:
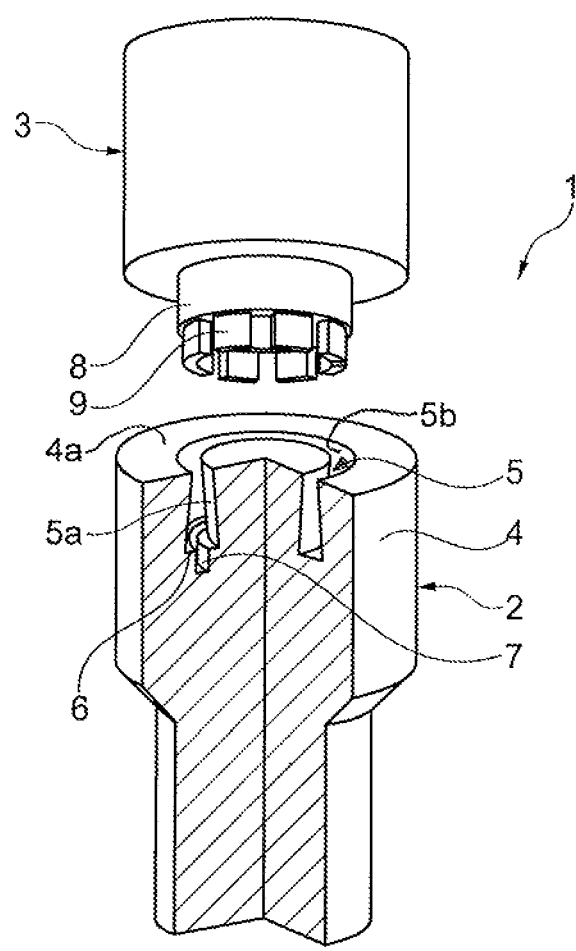
FIG. 1 is a schematic illustration of an embodiment of a system according to the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In the different figures, identical components are always given the same reference numerals, for which reason they are generally also only described once.

Figure 2:
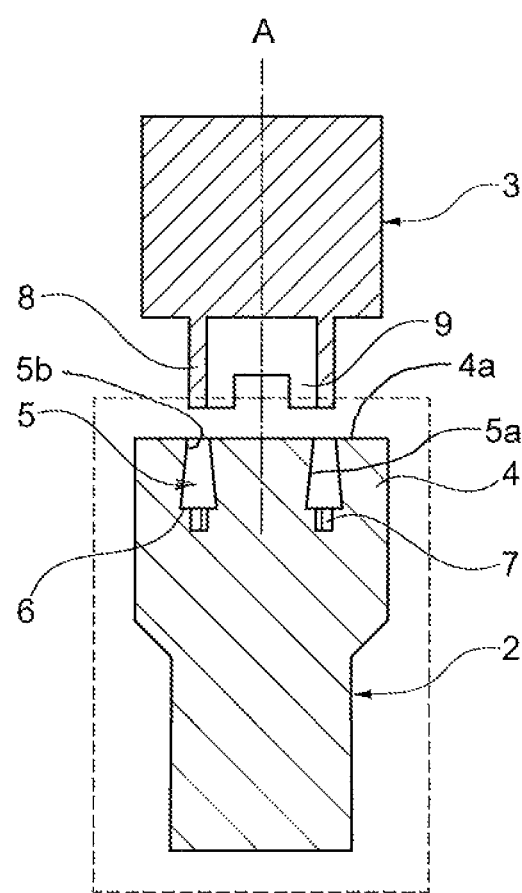
FIG. 2 is a schematic sectioned illustration of another embodiment of a system according to the invention.

FIGS. 1 and 2 are schematic illustrations of an embodiment of a system 1 according to the invention for connecting a wheel rim (not shown) to a hub flange (not shown) of a motor vehicle (not shown).

The system 1 has a rotatable fastener 2 (shown in the form of a wheel nut, the threaded portion of which is not depicted) which is shown in partial longitudinal section. Furthermore, the system 1 has a tool 3 which can be connected in a positive-locking manner to the fastener 2 in order to rotate the fastener 2 about its axis A (see FIG. 2) as required to tighten or release the fastener 2 from a mating component (not shown). The fastener 2 and the tool 3 may each advantageously be produced using an additive manufacturing method.

A head 4 of the fastener 2 has formed therein an annular groove 5 which extends axially into the head from an end surface 4a of the head. The bottom of the groove 5 is defined by a base 6 in which there are formed a plurality of recesses 7 projecting axially deeper into the head 4. Each of the recesses 7 extends around a portion of the circumference of the base 6 and the recesses are spaced circumferentially from one other. The circumferential spacing between adjacent recesses may be equal or may be irregular. Likewise, the circumferential length of each respective recess may be equal or may vary.

Above the base 6, the groove 5 is defined by an inner sidewall 5a and an outer sidewall 5b. The radial spacing between the inner and outer sidewalls 5a, 5b is non-uniform over the axial depth of the groove 5 so that the groove width is non-uniform, and at least a portion of the axial depth has a width greater than the width of the groove at the end surface 4a (at the opening of the groove). In the illustrated embodiment, the groove width is at a minimum at the end surface 4a and increases linearly with increased groove depth to reach a maximum width at the base, but this is only one possible geometry. A peripheral undercut is thereby formed in or by the groove 5. This undercut prevents an unauthorized person using a mold-making material, such as wax, from being able to make an imprint of the geometry of the groove and using the imprint to produce a tool for releasing the fastener. This is because, as a result of the presence of the undercut in/within the groove, the mold-making material would be deformed when pulled out of the groove.

A positioning marking which is not shown for positioning the tool 3 relative to the fastener 2 may be arranged on the head 4. There may also be arranged on the tool 2 a positioning marking which is not shown for positioning the tool 3 relative to the fastener 2 and which can be orientated in a specific manner relative to the positioning marking on the fastener 2.

There is formed on the tool 3 an annular key 8 which is complementary-shaped with respect to the groove 5 and recesses 7. In particular on the key 8, a plurality of coupling projections 9 are arranged peripherally spaced from one other in either a uniform or non-uniform manner, the number, shape and positioning or the projections corresponding to the number, shape and positioning of the recesses 7 extending below the base 6 of the groove 5, so that the coupling projections 9 engage in the recesses 7 in a positive-locking manner when the key 8 is inserted fully downward (as viewed in FIGS. 1 and 2) into the groove 5. When the key 8 is thus engaged with the groove 5, it is thereby possible for torque to be transmitted from the tool 3 to the fastener 2 to rotate the fastener about its axis A.

Figure 3:
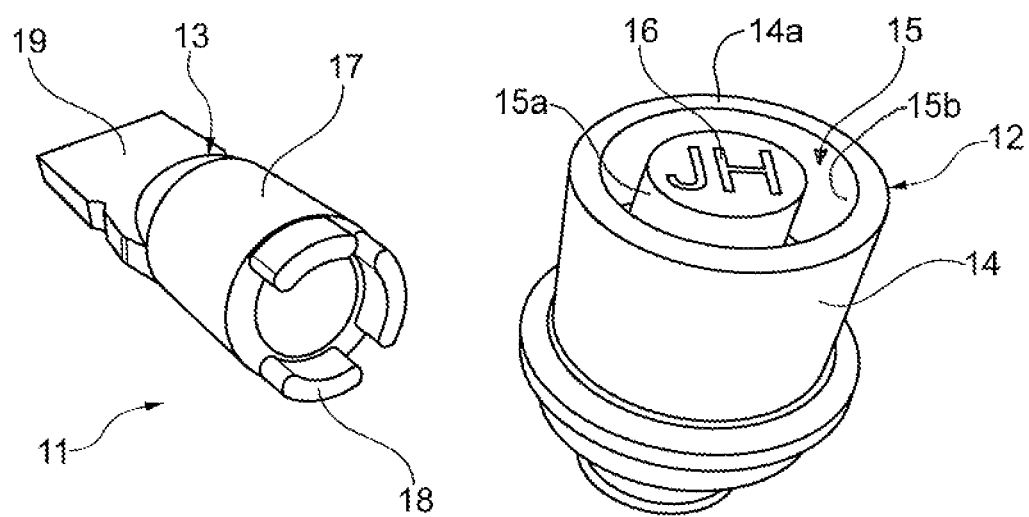
FIG. 3 is a schematic illustration of an embodiment of a system according to the invention.
Figure 4:
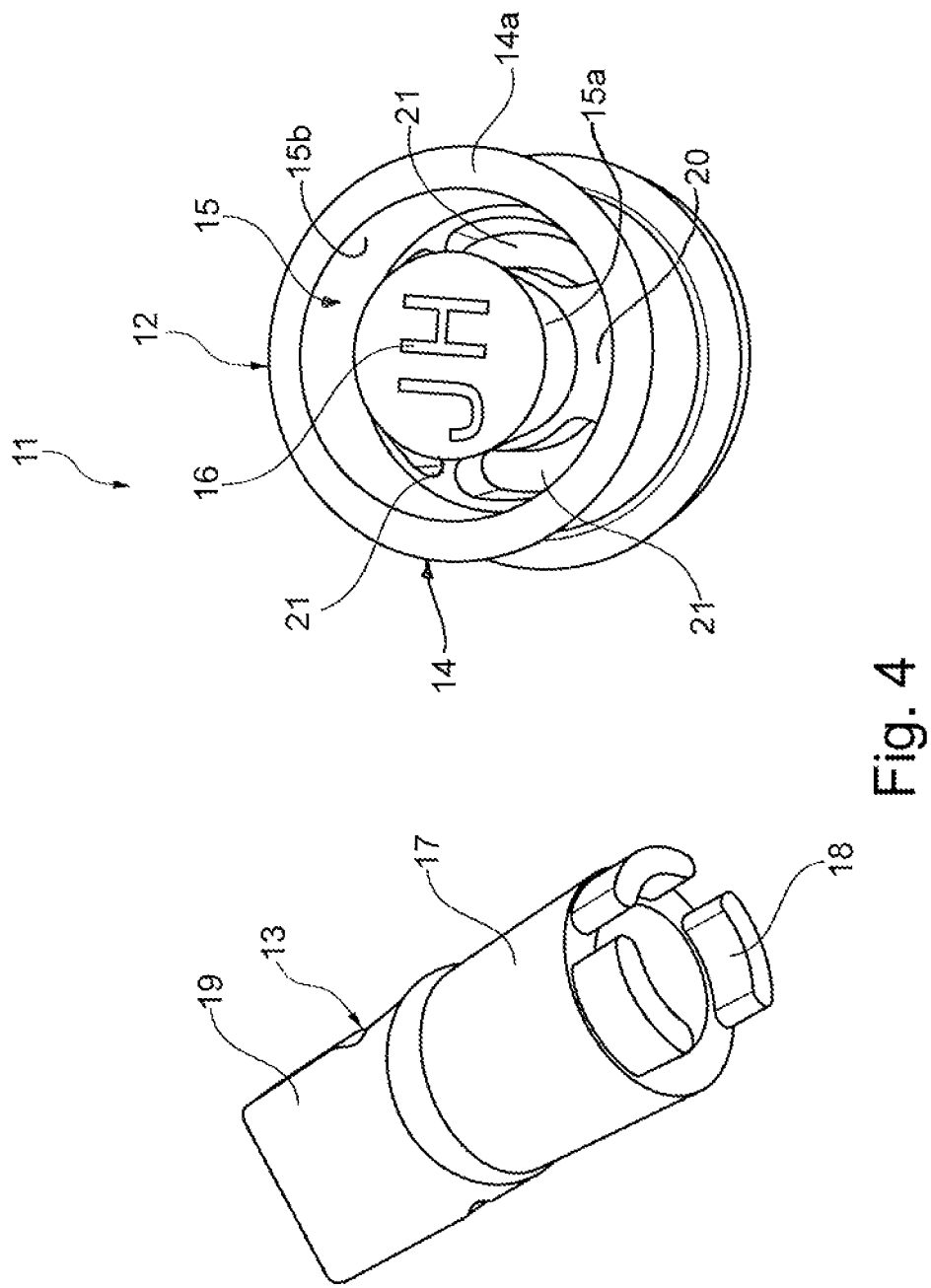
FIG. 4 is another schematic illustration of the system shown in FIG. 3.

FIGS. 3 and 4 are schematic illustrations of a further embodiment of a system 11 according to the invention for connecting a wheel rim which is not shown to a hub flange (not shown) of a motor vehicle which is not shown.

The system 11 has a metal fastener 12 in the form of a wheel nut and a metal tool 13 which can be connected to the fastener 12 in a positive-locking manner for tightening or releasing the fastener 12. The fastener 12 and the tool 13 may in each case be produced using an additive production method.

A groove 15 is formed in the fastener 12, extending axially into a head 4 thereof. The groove 15 is constructed in an annular manner and has a base 20 (indicated in FIG. 4) in which there are formed three recesses 21 (indicated in FIG. 4) which each extend circumferentially around a portion of the base and are arranged circumferentially space from each other in a non-uniform manner. That is, the recesses 21 are irregularly spaced around the circumference of the groove 15. The portion of the groove 15 disposed above the base 20 is configured as a peripheral closed channel having sidewalls 15a, 15b, the separation or distance between the sidewalls being non-uniform (varying) over the depth of the groove 15 in a manner such that the width of the groove at the groove opening (at end surface 14a) is smaller than the groove width deeper in the groove at at least one distance/depth below the opening. A peripheral or radial undercut is thereby formed by or in the groove 15. Stated another way, at least a portion of the groove 15 between the top opening of the groove (at the end surface and the base 20 is of a width greater than the width of the groove at the top opening. This undercut prevents an unauthorized person using a mold-making material, such as wax, from being able to make an imprint of the geometry of the groove and using the imprint to produce a tool for releasing the fastener. This is because, as a result of the presence of the undercut in/within the groove, the mold-making material would be deformed when pulled out of the groove.

A positioning marking which is not shown for positioning the tool 13 relative to the fastener 12 may be arranged on the head 14. There may also be arranged on the tool 12 a positioning marking which is not shown for positioning the tool 13 relative to the fastener 12 and which is intended to be orientated in a specific manner relative to the positioning marking on the fastener 12. Two letters 16 are constructed on the head 14, whereby the fastener 12 is additionally individualized. Letters 16 may be either raised or relieved relative to the surrounding surface of the head 14.

There is formed on the tool 13 an axially-projecting, annular key 17 which is complementary-shaped relative to the groove 15 and the recesses 21. In particular on the key 17 there are arranged circumferentially offset from each other (in a non-uniform manner) three axial coupling projections 18 whose number, shape and positioning correspond to the number, shape and positioning of the recesses 21 shown in FIG. 4 so that the coupling projections 18 can engage in the recesses in a positive-locking manner. It is thereby possible for torque to be transmitted from the tool 13 to the fastener 12. The key 17 is adjoined in the embodiment illustrated by an actuation portion 19 on which a tool which is not shown can engage in order to activate the tool 13. Of course, it is possible for the tool 13 to be constructed with an actuation portion 19 being omitted. The tool 13 would then be able to be actuated, for example, with a tool, that is to say, for example, an impact wrench with a square or hexagonal receiving member or the like.

Figure 5:
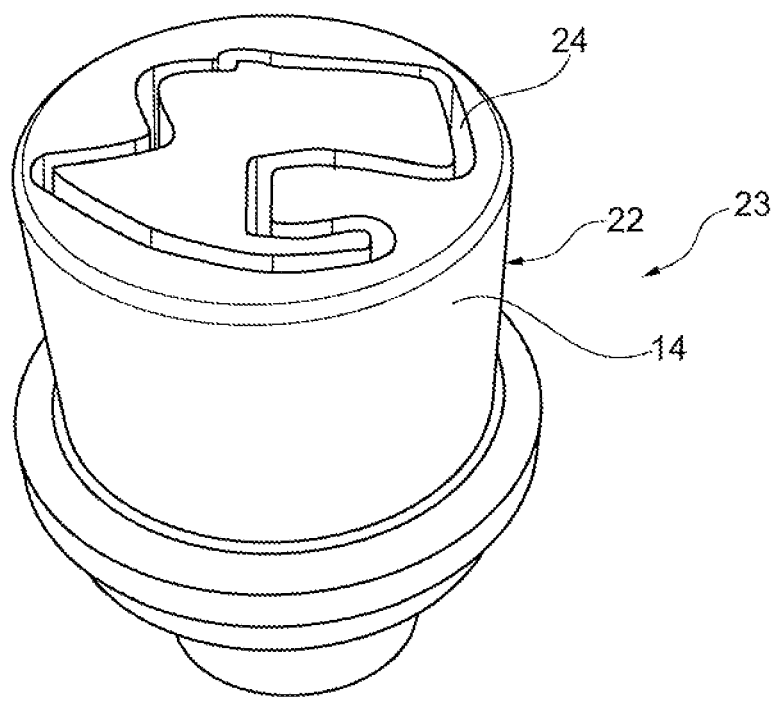
FIG. 5 is a schematic and perspective illustration of a fastener of another embodiment of a system according to the invention.

FIG. 5 is a schematic and perspective illustration of a fastener 22 of another embodiment of a system 23 according to the invention for connecting a wheel rim which is not shown to a hub flange (not shown) of a motor vehicle which is not shown.

The fastener 22 differs from the embodiment shown in FIGS. 3 and 4 in particular in that the groove 24 is constructed as an asymmetrically formed recess, that is to say, as a closed channel. On the tool of the system 23 which is not shown there is formed an asymmetrically shaped key which is constructed so as to complement the groove 24. In order to prevent repetition, reference is further made to the above description in relation to FIGS. 3 and 4.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tamper-resistant rotatable fastener for securing a wheel rim to a hub of a motor vehicle, comprising:
   a head having an end surface perpendicular to a rotation axis of the fastener;
   an annular key-receiving groove extending axially into the head from the end surface and defined by a base and inner and outer sidewalls, the groove having an undercut portion of greater radial width than an opening of the groove; and
   at least one recess formed in the base for receiving a projection of a complementally-shaped key to allow rotation of the fastener.

2. The fastener of claim 1, wherein a plurality of recesses are formed in the base, and the recesses are spaced from one another around a circumference of the groove in an irregular manner.

3. The fastener of claim 1, wherein the groove increases in width linearly from a minimum width at the end surface to a maximum width at the base.

4. The fastener of claim 1, wherein the head is produced using an additive production method.

5. A rotatable fastener, comprising:
- a head having an end surface perpendicular to an axis of the fastener;
- an annular groove extending axially into the head from the end surface and defined by a base and inner and outer sidewalls, the groove forming an undercut wider than an opening of the groove; and
- a recess extending below the base for receiving a projection of a complementally-shaped key to allow rotation of the fastener.

6. The fastener of claim 5, wherein a plurality of recesses are formed in the base, and the recesses are spaced from one another around a circumference of the groove in an irregular manner.

7. The fastener of claim 5, wherein the groove increases in width linearly from a minimum width at the end surface to a maximum width at the base.

8. The fastener of claim 5, wherein the head is produced using an additive production method.

9. A rotatable fastener having an annular groove extending axially from an end surface of the fastener, the groove having an annular base and inner and outer sidewalls shaped to form an undercut wider than an opening of the groove, a recess extending axially below the base for receiving a projection of a complementally-shaped key to allow rotation of the fastener.

10. The fastener of claim 9, wherein a plurality of recesses are formed in the base, and the recesses are spaced from one another around a circumference of the groove in an irregular manner.

11. The fastener of claim 9, wherein the groove increases in width linearly from a minimum width at the end surface to a maximum width at the base.

12. The fastener of claim 9, wherein the head is produced using an additive production method.

* * * * *